US012810626B2

(12) United States Patent
Horinaga et al.

(10) Patent No.: US 12,810,626 B2
(45) Date of Patent: Nov. 24, 2026

(54) IMAGE PROCESSING DEVICE

(71) Applicant: HITACHI ASTEMO, LTD., Hitachinaka (JP)

(72) Inventors: Maho Horinaga, Hitachinaka (JP); Naoya Tada, Hitachinaka (JP); Hiroto Mitoma, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 19/113,087

(22) PCT Filed: Dec. 5, 2022

(86) PCT No.: PCT/JP2022/044773

§ 371 (c)(1), (2) Date: Mar. 19, 2025

(87) PCT Pub. No.: WO2024/121911

PCT Pub. Date: Jun. 13, 2024

(65) Prior Publication Data

US 2026/0100053 A1 Apr. 9, 2026

(51) Int. Cl.
*G06V 20/58* (2022.01)

(52) U.S. Cl.
CPC .......... *G06V 20/58* (2022.01); *G06V 2201/07* (2022.01)

(58) Field of Classification Search
CPC . G06V 20/58; G06V 2201/07; B60W 60/001; B60W 50/14; B60W 2552/05;
(Continued)

(56) References Cited

U.S. PATENT DOCUMENTS

2008/0309517 A1 12/2008 Saito
2018/0137375 A1 5/2018 Takemura et al.
(Continued)

FOREIGN PATENT DOCUMENTS

JP 2008-301342 A 12/2008
JP 2011-009863 A 1/2011
(Continued)

OTHER PUBLICATIONS

International Search Report with English Translation and Written Opinion of International Application No. PCT/JP2022/044773 dated Feb. 14, 2023 (8 pages).
(Continued)

*Primary Examiner* — Alazar Tilahun
(74) *Attorney, Agent, or Firm* — Foley & Lardner LLP

(57) ABSTRACT

An image processing device includes a computation device to which an image obtained by using an imaging device to capture the area in front of a vehicle is inputted, wherein the computation device calculates, for each of a plurality of regions included in the image, the parallax of a subject image included in the region, and determines whether or not a tunnel exit exists in a specific region among the plurality of regions on the basis of the position of a region, among the plurality of regions, for which the parallax of the subject image cannot be calculated and a parallax calculated in another region located near the region for which the parallax of the subject image cannot be calculated.

5 Claims, 8 Drawing Sheets

(58) Field of Classification Search
CPC ......... B60W 2556/40; B60W 2556/45; B60W 2720/10; B60W 30/182; B60W 2556/50
See application file for complete search history.

(56) References Cited

U.S. PATENT DOCUMENTS

| | | | | |
|---|---|---|---|---|
| 2018/0265097 | A1* | 9/2018 | Suzuki .................. | B60W 30/12 |
| 2018/0357495 | A1 | 12/2018 | Watanabe | |
| 2021/0316734 | A1* | 10/2021 | Honda ................... | G06V 20/58 |
| 2023/0150534 | A1* | 5/2023 | Song ................... | B60W 60/001<br>701/24 |

FOREIGN PATENT DOCUMENTS

| | | | |
|---|---|---|---|
| JP | 2020-204842 | A | 12/2020 |
| KR | 101511586 | B1 | 4/2015 |
| WO | WO-2017/014023 | A1 | 1/2017 |
| WO | WO-2017/145600 | A1 | 8/2017 |
| WO | WO-2019/142586 | A1 | 7/2019 |

OTHER PUBLICATIONS

Extended European Search Report issued in corresponding EP Application No. 22967765.3 dated Sep. 1, 2025 (8 Pages).

* cited by examiner

[FIG. 1]
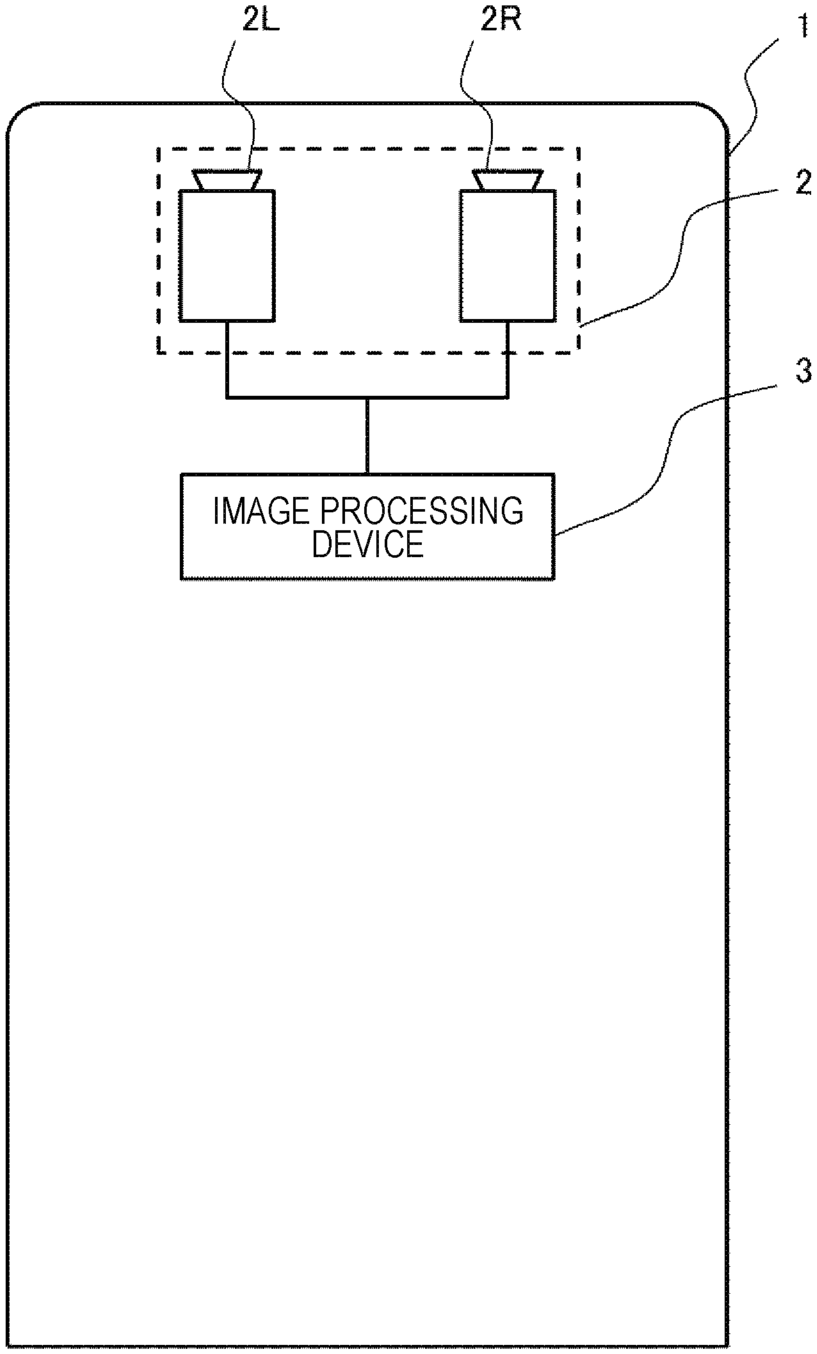

[FIG. 2]
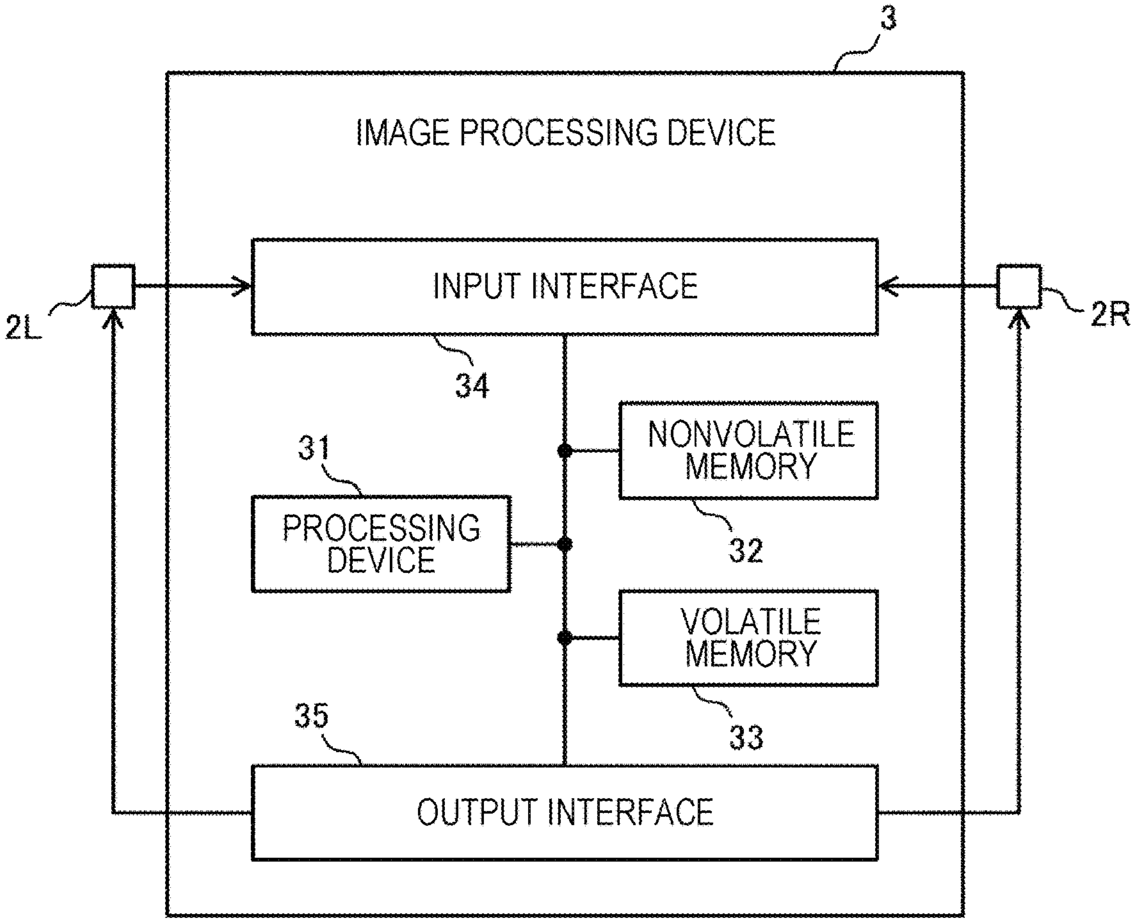

[FIG. 3]
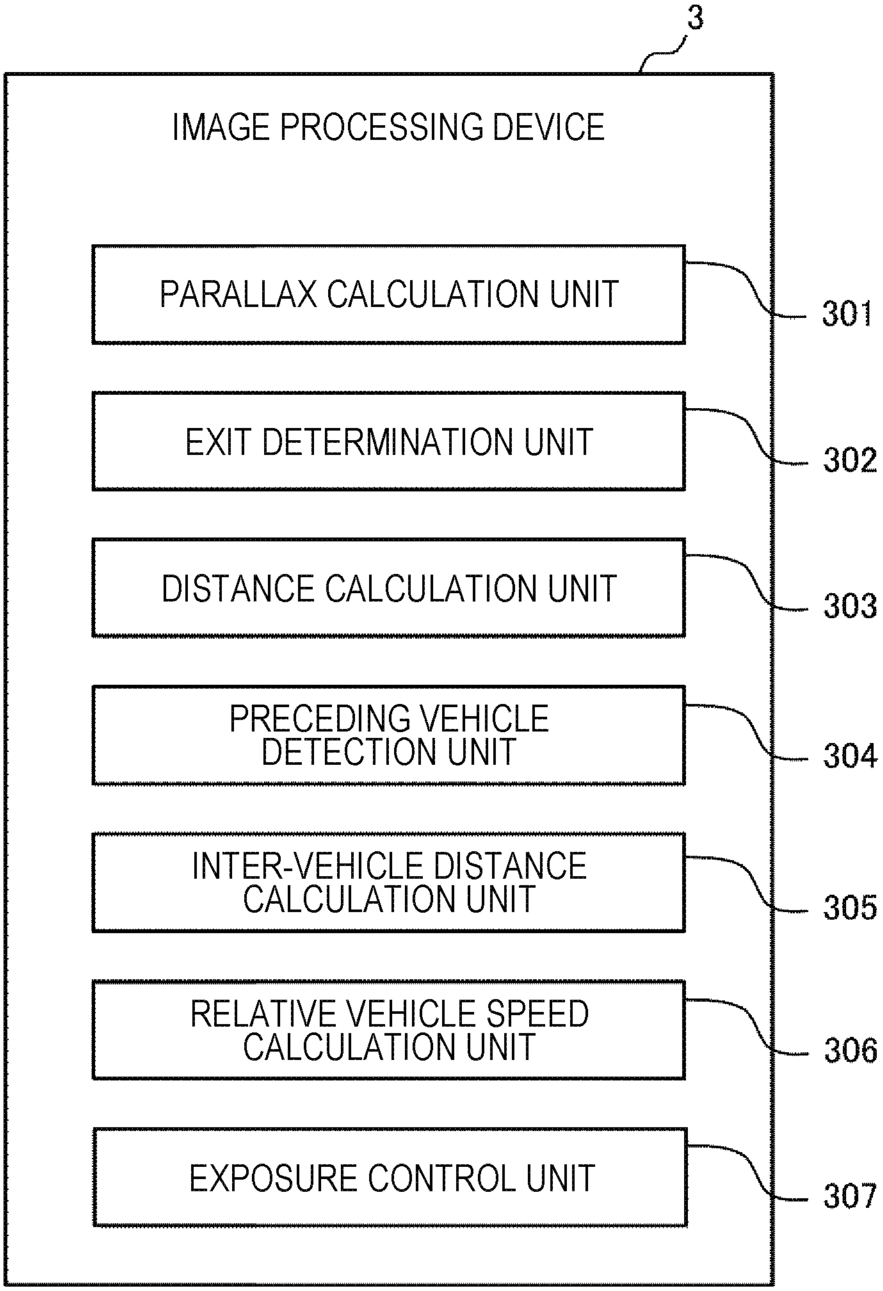

[FIG. 4]
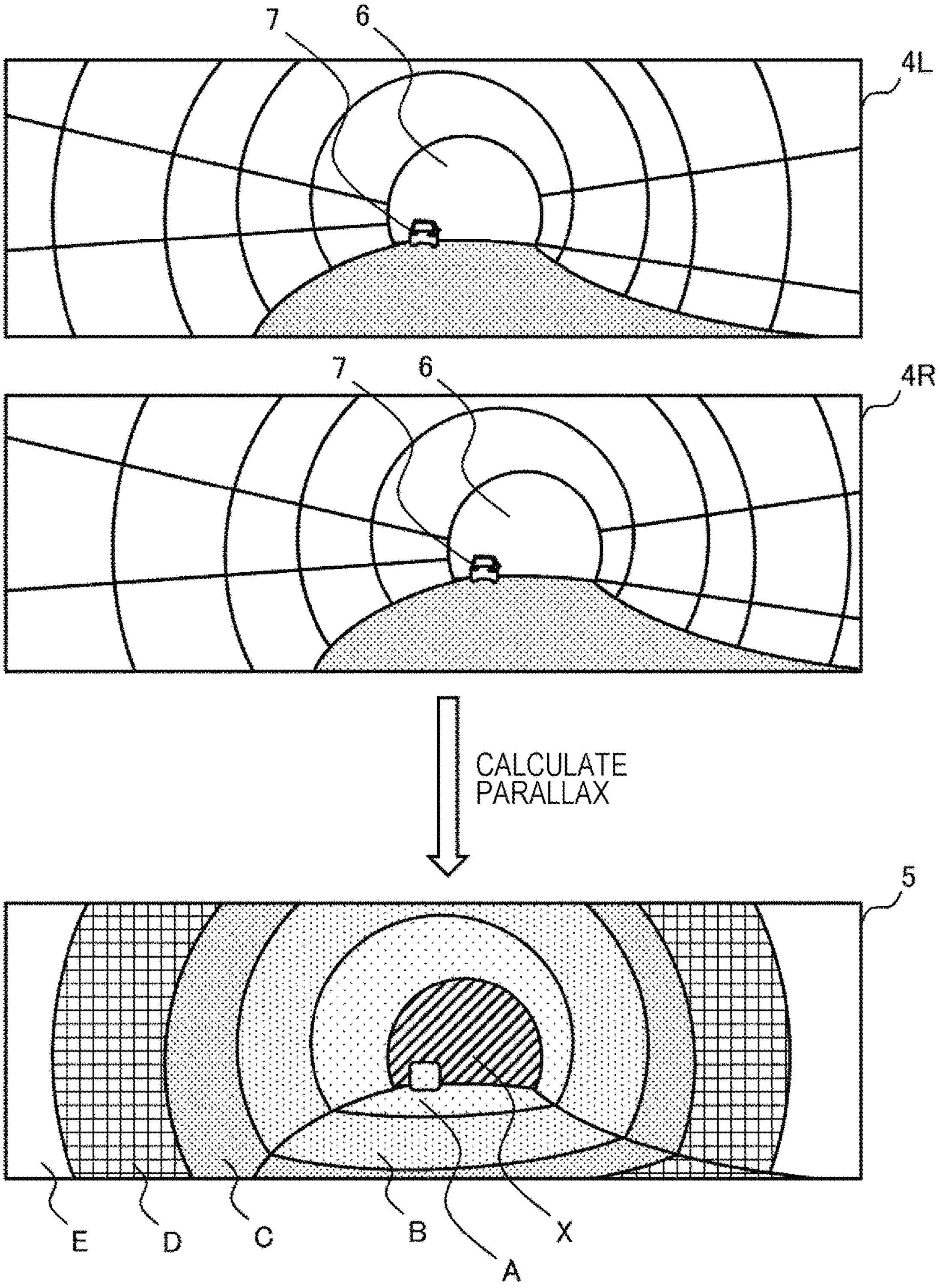

[FIG. 5]
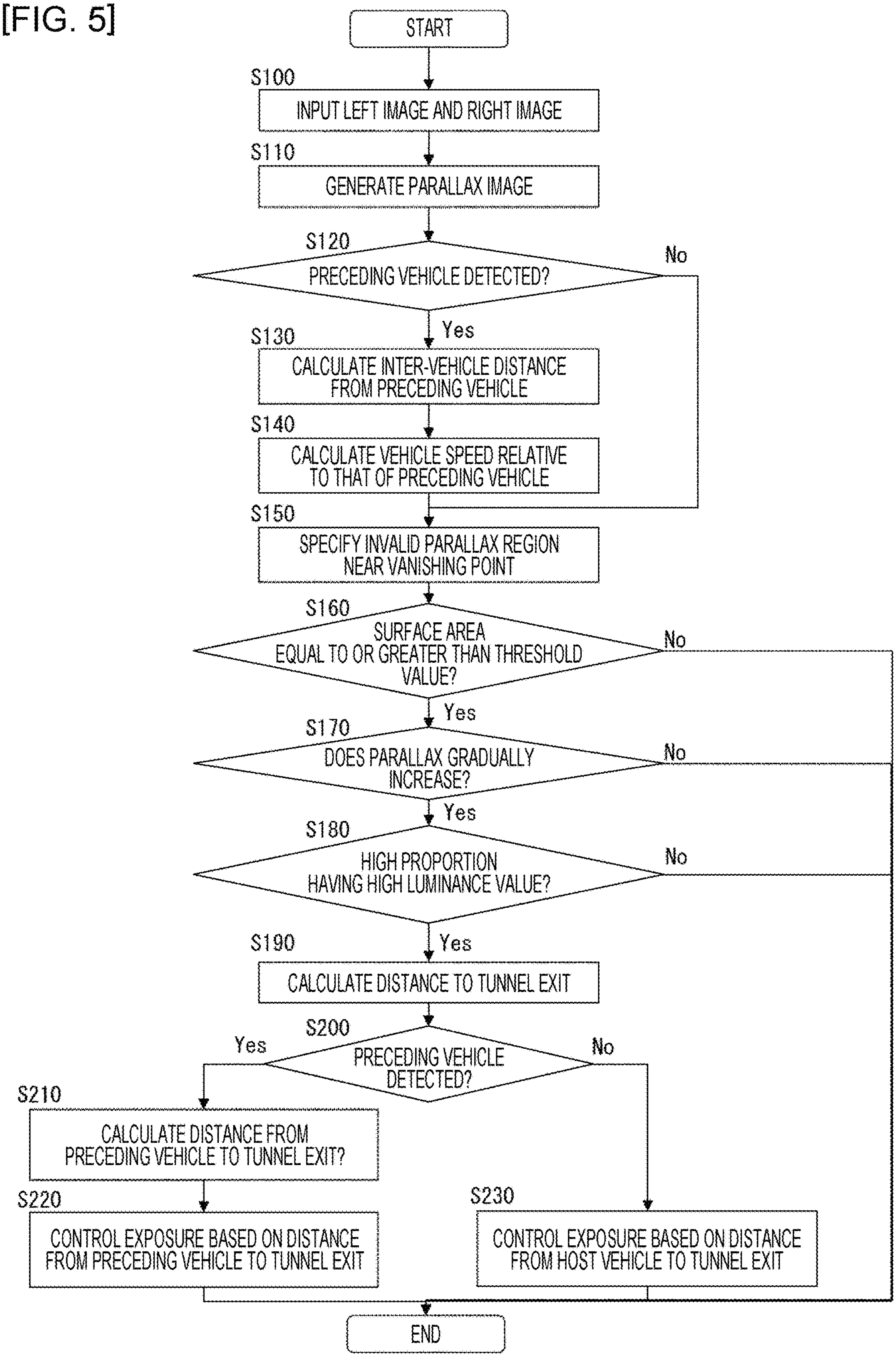

[FIG. 6]
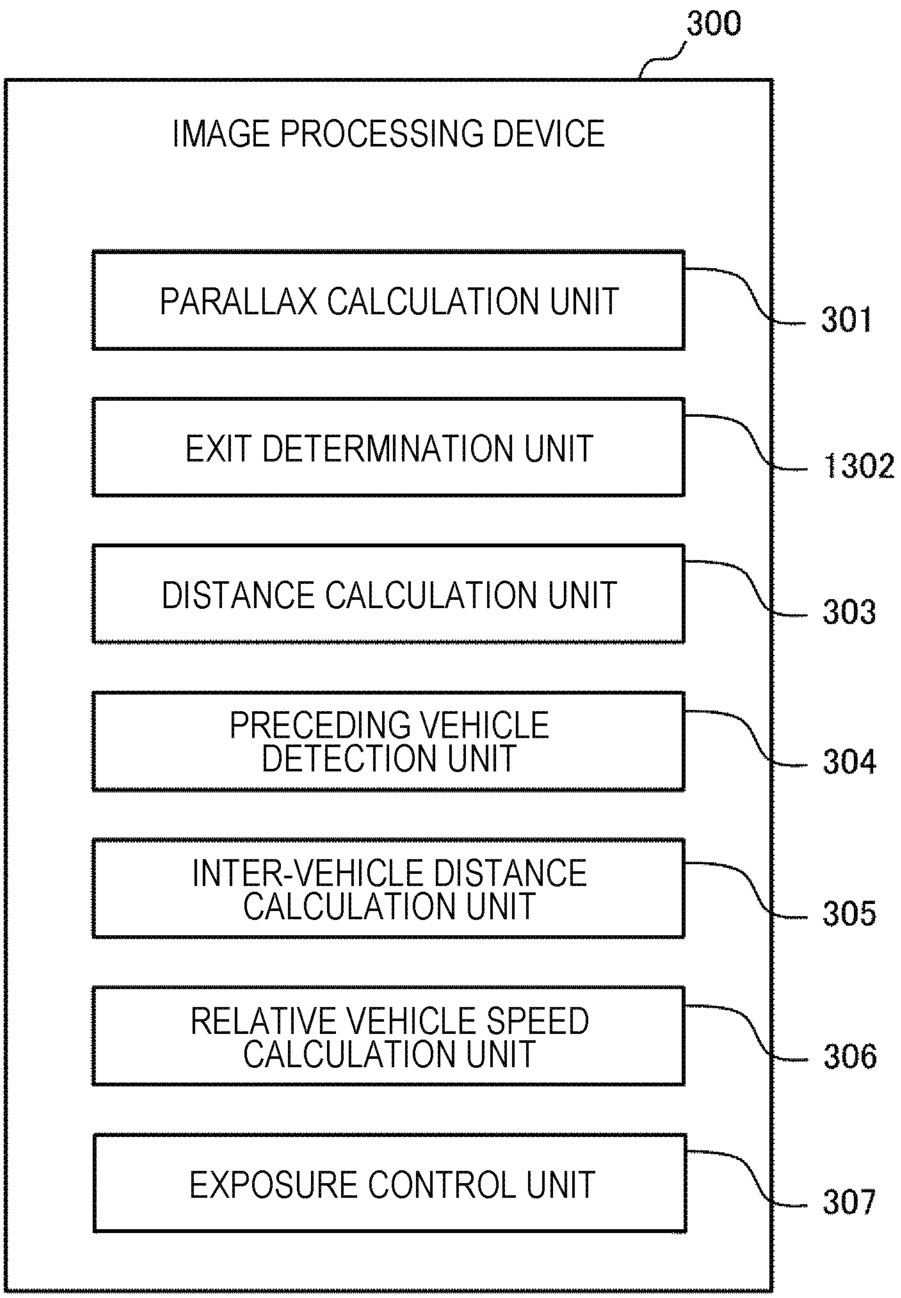

[FIG. 7]
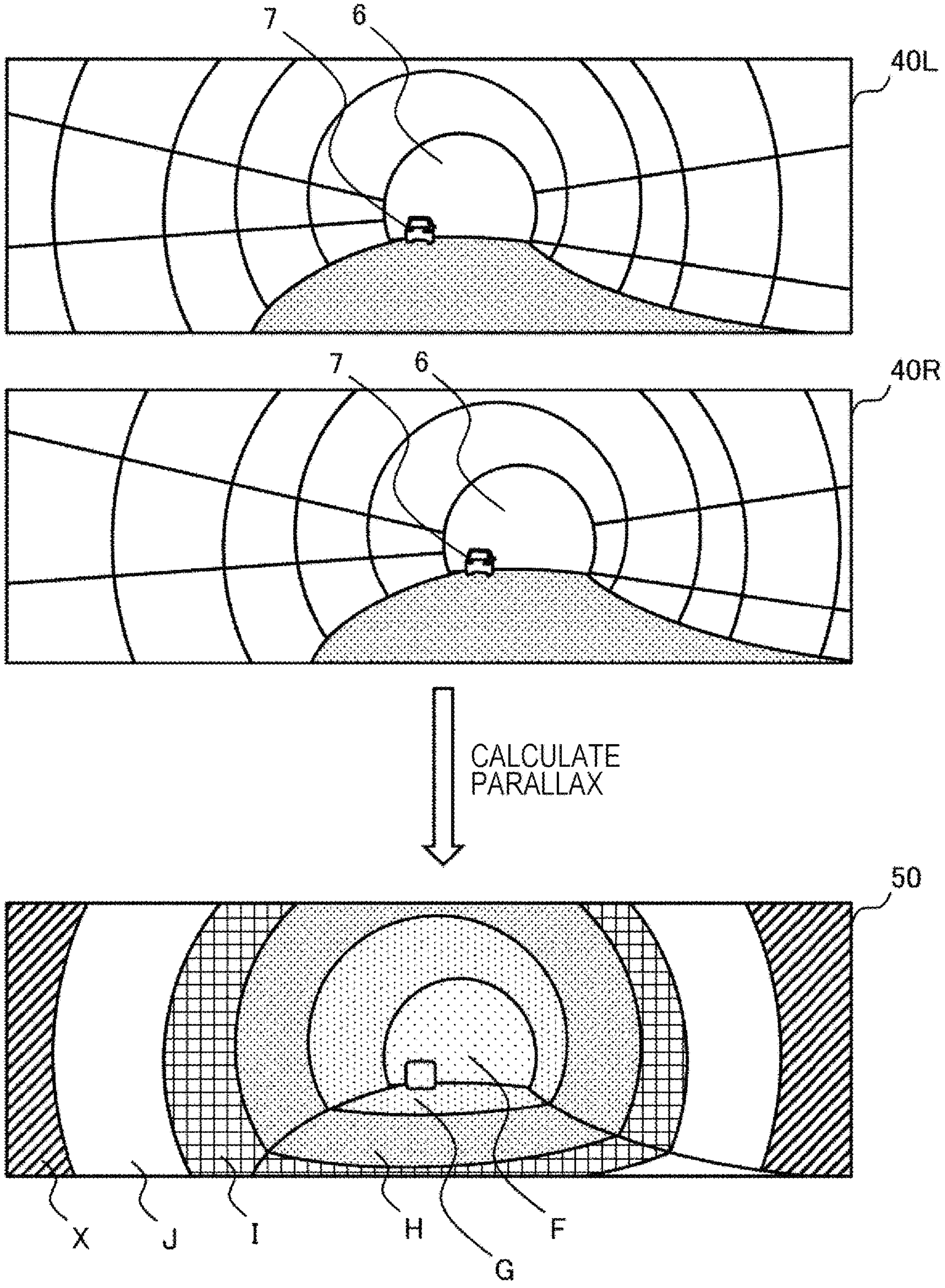

[FIG. 8]
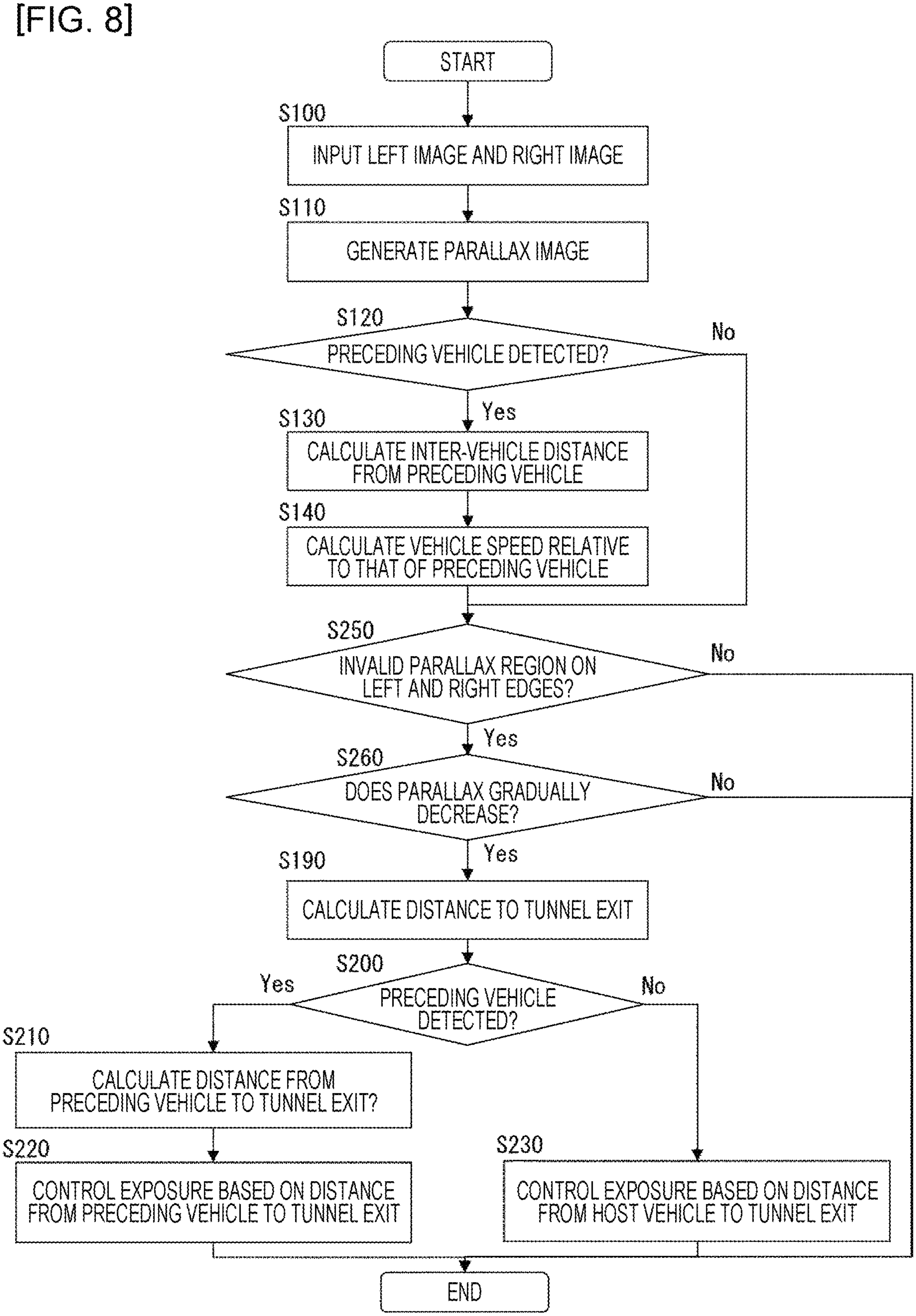

IMAGE PROCESSING DEVICE

TECHNICAL FIELD

The present invention relates to an image processing device.

BACKGROUND ART

Conventionally, a technique has been known for predicting a rapid change in contrast so as not to lose sight of a preceding vehicle even in an environment such as a tunnel exit where the contrast rapidly changes. PTL 1 discloses a technique for setting, on an image, a monitoring region around an object detected as a preceding vehicle, and predicting that the preceding vehicle will enter a bright region (or a dark region) by using the number of pixels having a luminance equal to or higher than a threshold value in the monitoring region (or pixels having a luminance less than the threshold value).

CITATION LIST

Patent Literature

PTL 1: JP 2008-301342 A

SUMMARY OF INVENTION

Technical Problem

The technique described in PTL 1 was faced with the problem that a preceding vehicle needs to be detected first in order to detect a bright region such as an exit of a tunnel, on the basis of the position of the preceding vehicle.

Solution to Problem

An image processing device according to one aspect of the present invention includes a computation device to which an image obtained by using an imaging device to capture the area in front of a vehicle is inputted, wherein the computation device calculates, for each of a plurality of regions included in the image, the parallax of a subject image included in the region, and determines whether or not a tunnel exit exists in a specific region among the plurality of regions on the basis of the position of a region, among the plurality of regions, for which the parallax of the subject image cannot be calculated and a parallax calculated in another region located near the region for which the parallax of the subject image cannot be calculated.

Advantageous Effects of Invention

The present invention makes it possible to provide an image processing device capable of detecting an exit and entrance of a tunnel without waiting for detection of a preceding vehicle.

BRIEF DESCRIPTION OF DRAWINGS

FIG. 1 is a block diagram schematically showing a configuration of a vehicle equipped with an image processing device according to a first embodiment.

FIG. 2 is a block diagram schematically showing a hardware configuration of the image processing device according to the first embodiment.

FIG. 3 is a functional block diagram of the image processing device according to the first embodiment.

FIG. 4 is a diagram schematically showing a left image, a right image, and a parallax image.

FIG. 5 is a flowchart of arithmetic processing by a processing device.

FIG. 6 is similar to FIG. 3 and is a functional block diagram of an image processing device according to a second embodiment.

FIG. 7 is a diagram schematically showing a left image, a right image, and a parallax image.

FIG. 8 is similar to FIG. 5 and is a flowchart showing an example of arithmetic processing executed by a processing device according to the second embodiment.

DESCRIPTION OF EMBODIMENTS

First Embodiment

An image processing device according to embodiments of the present invention will be described with reference to FIGS. 1 to 6.

FIG. 1 is a block diagram schematically showing a configuration of a vehicle equipped with an image processing device according to a first embodiment. A vehicle 1 is provided with a left camera 2L, a right camera 2R, and an image processing device 3. In the following description, the left camera 2L and the right camera 2R are collectively referred to as the camera 2.

The camera 2 is mounted near a rearview mirror in the vehicle cabin of vehicle 1. The camera 2 captures images of the front of the vehicle 1. The left camera 2L and the right camera 2R are installed so that their optical axes are parallel and at the same height. An image captured by the left camera 2L is referred to as a left image. The left camera 2L periodically captures a left image and inputs the left image to the image processing device 3. An image captured by the right camera 2R is referred to as a right image. The right camera 2R periodically captures a right image and inputs the right image to the image processing device 3. In the present embodiment, the left camera 2L and right camera 2R simultaneously capture a left image and a right image. In other words, the left image and the right image are images obtained by imaging the front of the vehicle 1 at the same timing. Note that the optical axes of the left camera 2L and the right camera 2R do not need to be parallel. In this case, it is desirable to parallelize the left image and the right image in the camera 2 or the image processing device 3.

FIG. 2 is a block diagram schematically showing a hardware configuration of the image processing device 3 according to the first embodiment. The image processing device 3 is configured from a computer that includes a processing device 31 such as a central processing unit (CPU), a micro processing unit (MPU), or a digital signal processor (DSP); a nonvolatile memory 32 such as a read-only memory (ROM), a flash memory, or a hard disk drive; a volatile memory 33 referred to as a so-called random access memory (RAM); an input interface 34; an output interface 35; and other peripheral circuits (not illustrated). Note that an application-specific integrated circuit (ASIC), a field-programmable gate array (FPGA), or the like can also be used as the processing device 31. The nonvolatile memory 32 and the volatile memory 33 function as storage devices that store information (data).

The nonvolatile memory 32 stores a program capable of executing various operations. That is, the nonvolatile memory 32 is a storage device (storage medium) capable of reading a program for implementing the functions of the present embodiment. The processing device 31 is a computation device that deploys, in the volatile memory 33, a program stored in the nonvolatile memory 32 to execute an arithmetic operation, and performs, according to the program, predetermined arithmetic processing on data acquired from the input interface 34, and from the nonvolatile memory 32 and the volatile memory 33 which constitute storage devices. The functions realized by this program will be described below.

The input interface 34 converts the left image and the right image captured by the camera 2 so that the left image and the right image can be calculated by the processing device 31. Furthermore, the output interface 35 generates an exposure control signal according to the calculation result by the processing device 31 and outputs the signal to the camera 2.

Note that the image processing device 3 may be configured from a single computer or may be configured from a plurality of computers. In a case where the image processing device 3 is configured from a plurality of computers, the functions of the image processing device 3 are implemented by a plurality of processing devices 31.

FIG. 3 is a functional block diagram of the image processing device 3. Due to the processing device 31 executing the program stored in the nonvolatile memory 32, the image processing device 3 functions as a parallax calculation unit 301, an exit determination unit 302, a distance calculation unit 303, a preceding vehicle detection unit 304, an inter-vehicle distance calculation unit 305, a relative vehicle speed calculation unit 306, and an exposure control unit 307.

The parallax calculation unit 301 generates a parallax image by using the left image and the right image which are captured simultaneously by the left camera 2L and the right camera 2R. The exit determination unit 302 determines the presence or absence of the exit and entrance of a tunnel on the travel path of the vehicle 1 by using the parallax image calculated by the parallax calculation unit 301. The distance calculation unit 303 calculates the distances from the vehicle 1 to the exit and entrance of the tunnel. The preceding vehicle detection unit 304 detects another vehicle located in front of the vehicle 1, that is, a preceding vehicle. The inter-vehicle distance calculation unit 305 calculates the distance from the vehicle 1 to the preceding vehicle, that is, the inter-vehicle distance. The relative vehicle speed calculation unit 306 calculates the relative vehicle speed between the vehicle 1 and the preceding vehicle. For example, when the vehicle speed of the vehicle 1 is equal to the vehicle speed of the preceding vehicle, the relative vehicle speed calculated by the relative vehicle speed calculation unit 306 is 0 km/h. In addition, when the vehicle speed of the vehicle 1 is 30 km/h and the vehicle speed of the preceding vehicle is 50 km/h, the relative vehicle speed calculated by the relative vehicle speed calculation unit 306 is 20 km/h. The exposure control unit 307 controls the exposure of the camera 2. In other words, the exposure control unit 307 adjusts the exposure amount of the camera 2 so that the exposure of the camera 2 is appropriate.

(Parallax Image Generation Method Using Parallax Calculation Unit 301)

FIG. 4 is a diagram schematically showing a left image, a right image, and a parallax image. Left image 4L and right image 4R illustrated in FIG. 4 are images captured in the tunnel. The left image 4L and the right image 4R include a tunnel exit 6 and a preceding vehicle 7. Here, because the tunnel exit 6 is very bright compared to the inside of the tunnel, it is assumed that the portion of the tunnel exit 6 is overexposed in the left image 4L and the right image 4R. Hereinafter, a method for generating a parallax image 5 from the left image 4L and the right image 4R by using the left image 4L, the right image 4R, and the parallax image 5 illustrated in FIG. 4 will be described.

The parallax calculation unit 301 divides the left image 4L into a plurality of pixel blocks in a lattice shape. One pixel block has a size of, for example, 16 pixels in a vertical direction and 16 pixels in a horizontal direction. That is, one pixel block includes 256 pixels in total. Note that the size of the pixel blocks may differ from this pixel size. Furthermore, the pixel blocks may have a rectangular shape instead of a square shape. Like the left image 4L, the parallax calculation unit 301 divides the right image 4R into a plurality of pixel blocks in a lattice pattern.

In the following description, the pixel blocks in the left image 4L are referred to as BL(x, y). Here, x is an index value representing the positions of the pixel blocks in the horizontal direction. In the leftmost pixel block, x is 1 and increases by one in a rightward direction. Similarly, y is an index value representing the positions of the pixel blocks in the vertical direction. In the topmost pixel block, y is 1 and increases by one in a downward direction. Similarly to the left image 4L, pixel blocks in the right image 4R are expressed as BR(x, y). The meanings of x and y are the same as those for the pixel blocks BL(x, y) of the left image 4L.

The parallax calculation unit 301 calculates the parallax of the subject image included in the pixel blocks of these rows by comparing the plurality of pixel blocks BL(x, y) arranged in a row in the horizontal direction in the left image 4L with the plurality of pixel blocks BR(x, y) arranged in a row in the same positions as the plurality of pixel blocks BL(x, y) in the right image 4R.

First, the description will focus on the leftmost pixel block BL(1,1) in the left image 4L. The degree of matching with the pixel block of interest BL(1, 1) is calculated for each of the pixel blocks BR(1,1), BR(2,1), BR(3,1), . . . of the right image 4R, that is, the pixel blocks arranged in a row in the horizontal direction having the same position (y=1) in the vertical direction as the pixel block of interest BL(1,1). Here, the degree of matching is a numerical value obtained by quantifying to what extent the luminance values of the plurality of pixels included in one pixel block are similar to the luminance values of the plurality of pixels included in another pixel block. As the luminance values become closer to each other, the degree of matching increases. A specific method for calculating the degree of matching will be described below.

The parallax calculation unit 301 uses the calculated degree of matching to specify the pixel block BR(i, 1) having the highest degree of matching with the pixel block BL(1, 1) of interest. At this time, the parallax in position x=1 and y=1 is $|i-1|$. That is, the difference in position in the lateral direction between the pixel block BR(i, 1) which most closely matches the pixel block of interest BL(1, 1) is the parallax of the subject image in the position of the pixel block of interest BL(1,1).

The parallax calculation unit 301 repeats this processing for all the pixel blocks BL(1, 1), BL(2, 1), BL(3, 1), . . . at position y=1 of the left image 4L, and calculates all the parallaxes at position y=1.

The parallax calculation unit 301 calculates all the parallaxes in the subject image at positions y=2, y=3, . . . by repeatedly executing the above processing while changing the position in the left image 4L little by little in the vertical direction. That is, for the positions of all the pixel blocks BL(x, y) included in the left image 4L, the parallax calculation unit 301 calculates the parallax corresponding to the subject image in these positions. Data obtained by arranging the parallaxes calculated in this manner two-dimensionally according to the positions where the parallaxes were calculated is a parallax image.

In parallax image 5 illustrated in FIG. 4, five regions A, B, C, D, and E exist in ascending order of parallax. That is, region A is the region having the smallest parallax, and region E is the region having the largest parallax. In addition to these regions A to E, there is a region X for which the parallax cannot be calculated. Note that the parallax image 5 illustrated in FIG. 4 is schematically illustrated to simplify the description. In practice, the parallax is calculated more finely than five stages. For this reason, by performing the steps more precisely, there are more regions having mutually different parallaxes than those illustrated in FIG. 4.

In a case where exposure control of the camera 2 is performed for the dark environment in the tunnel, overexposure occurs in a region for which the tunnel exit 6 exists in the captured image. That is, the luminance values of the pixels corresponding to the tunnel exit 6 are saturated. For example, in a case where the luminance values are represented by the integer values 0 to 255, the luminance values of the pixels corresponding to the tunnel exit 6 are 255, which is the maximum value. When the luminance values are saturated in this way in all the pixels included in one pixel block, the parallax value cannot be calculated from the pixel block. That is, the parallax value cannot be calculated using the pixel block corresponding to the tunnel exit 6.

In a case where the luminance values of all the pixels in the pixel blocks of the left image 4L have a maximum value, the parallax calculation unit 301 determines that the parallax cannot be calculated in a corresponding region X of the parallax image 5. In a case where it is determined that the parallax cannot be calculated at a certain position, the parallax calculation unit 301 uses a special value indicating that the parallax cannot be calculated (for example, a negative value) as the parallax value at the position. In the following description, this "special value indicating that the parallax could not be calculated" is referred to as an invalid parallax value. Further, region X where the parallax cannot be calculated and the invalid parallax value is set is referred to as an invalid parallax region. In contrast, regions A to E that are not invalid parallax regions are referred to as valid parallax regions.

For example, in a case where very dark portions such as portions which illumination light does not reach inside the tunnel are imaged, blackened-out spots may occur instead of blown-out highlights. For example, in a case where the luminance values are represented by the integer values 0 to 255, the luminance value of the pixels corresponding to a very dark location of this kind is 0, which is the minimum value. Even in a case where the luminance values reach the minimum value in all the pixels included in one pixel block as described above, the parallax value cannot be calculated from the pixel block. In a case where the luminance values of all the pixels in the pixel blocks of the left image 4L have a minimum value, the parallax calculation unit 301 also determines that the parallax cannot be calculated in the corresponding region of the parallax image 5.

As can be seen from the parallax image 5 illustrated in FIG. 4, a relatively large parallax value is obtained in a region E close to the vehicle (host vehicle) 1, and a relatively small parallax value is obtained in a region A far from the vehicle 1. Thus, the parallaxes gradually decrease in moving further from the vicinity of the vehicle 1. Therefore, in the parallax image 5, the parallax values of the road surface section gradually decrease from the lower side to the upper side in the vertical direction. Meanwhile, in a case where there is a three-dimensional object such as a vehicle, the same parallax values are obtained along the vertical direction within the range where the three-dimensional object exists in the parallax image 5. Therefore, by finding, in the parallax image 5, a region having the same parallax values along the vertical direction thereof, it can be determined that a three-dimensional object exists in the position of this region. That is, the three-dimensional object can be detected by finding a region, in the parallax image 5, having the same parallax values along the vertical direction.

Using the following equation (1), the distance from the vehicle 1 to an object present in an arbitrary region can be obtained from the parallax value of the arbitrary region.

$$d=(L+f)/p \tag{1}$$

Here, d is a distance to a target object, L is a baseline length between the left camera 2L and the right camera 2R, f is a focal length between the left camera 2L and the right camera 2R, and p is a parallax value.

A method for calculating the degree of matching will now be described. The degree of matching according to the present embodiment is the sum of absolute values of the luminance differences (SAD; Sum of the Absolute Differences) of the pixels in a pixel block. For example, in a case where one pixel block has a size of 16 pixels in a vertical direction and 16 pixels in a horizontal direction, one pixel block includes 256 pixels. When one pixel block in the left image 4L and one pixel block in the right image 4R oppose one other, there are 256 pairs of left and right pixels. For each of the 256 sets, the absolute value of the difference between the luminance values is calculated to obtain the absolute value of the difference between the 256 luminance values. The sum of the 256 absolute values is the degree of matching according to the present embodiment.

Note that the method for calculating the degree of matching is not limited to the above-described method using SAD, rather, other methods may be used. In addition, depending on what value is adopted as the degree of matching, it may be determined that parallax cannot be calculated for reasons other than being caused by the above-described blown-out highlights or blackened-out spots. Even in such cases, a region may be treated as an invalid parallax region as per the above-described method.

(Description of Method for Determining Tunnel Exit Using Exit Determination Unit 302)

A tunnel exit determination method by the exit determination unit 302 will be described using the left image 4L, the right image 4R, and the parallax image 5 illustrated in FIG. 4.

First, the exit determination unit 302 investigates whether an invalid parallax region exists in the vicinity of the optical axis position (vanishing point, here, center of parallax image 5) of the camera 2. For example, focusing on the regions corresponding to 11×11 pixel blocks centered on the center point of the parallax image 5, it is investigated whether an invalid parallax region exists among these regions. Note that the investigation range of the invalid parallax region i.e. "11×11 pixel blocks centered on the center point of the parallax image 5" is an example, and the presence or absence of the invalid parallax region may be investigated in a different range. For example, by setting this investigation range as a horizontally long rectangle, it is possible to detect a tunnel exit which is better in a case where the tunnel exit exists ahead of the curve. Furthermore, conversely, by shortening the search range in the lateral direction, the calculation amount can be reduced.

In a case where an invalid parallax region exists, the exit determination unit 302 calculates the total surface area of the invalid parallax region and all the invalid parallax regions that exist continuously with the invalid parallax region. Here, "exist continuously" means that the invalid parallax regions are adjacent to each other. In a case where the calculated total surface area is equal to or larger than a predetermined threshold value, the exit determination unit 302 investigates the ratio of the saturated pixels to the pixels included in the continuously existing invalid parallax regions. Here, the saturated pixel is a pixel having a luminance value equal to or greater than a predetermined threshold value. For example, in a case where the number of pixels included in the continuous invalid parallax region is 1000, and the luminance values of 400 pixels among the pixels are equal to or greater than the predetermined threshold value, the ratio calculated here is 400/1000=0.4.

The exit determination unit 302 investigates whether the calculated ratio is a predetermined threshold value (for example, 0.8) or more. In a case where the calculated ratio is the predetermined threshold value or more, the exit determination unit 302 further calculates the barycentric position when the continuously existing invalid parallax regions are connected to each other. Moving leftward starting from the barycentric position, a search for a valid parallax region, that is, a region for which the parallax can be calculated, is performed. The exit determination unit 302 goes around the valid parallax regions arranged in a row toward the left from the first found valid parallax region, and investigates whether the parallax values corresponding to these regions gradually increase. That is, whether the parallax values gradually increase in moving from the barycentric position in a leftward direction of the image is investigated. For example, in the parallax image 5 illustrated in FIG. 4, the regions A, B, C, D, and E exist in that order in moving from region X in a leftward direction of the image. That is, the parallax values gradually increase in moving from region X in a leftward direction of the image. In a case where the parallax values gradually increase, the exit determination unit 302 performs similar processing also in a rightward direction. In a case where the parallax values gradually increase not only in the leftward direction of the image but also in the rightward direction thereof, the exit determination unit 302 determines that these invalid parallax regions are tunnel exits, that is, tunnel exits exist at the positions of these invalid parallax regions.

On the left and right sides of the tunnel exit, the outer walls of the tunnel should be present along the road that leads continuously from the tunnel exit to the vehicle 1. Because the parallax value becomes larger as the distance from the vehicle 1 shortens, the parallax values calculated in the regions corresponding to the left and right tunnel outer walls should gradually increase from the tunnel exit toward the vehicle 1. The exit determination unit 302 executes the above-described processing by using this approach and thus determines the existence of the tunnel exit. That is, the exit determination unit 302 determines whether the tunnel exit exists in a region for which the parallax of the subject image cannot be calculated, on the basis of the position of the region for which the parallax of the subject image cannot be calculated and the parallax calculated in another region located in the vicinity of the region for which the parallax of the subject image cannot be calculated.

(Description of Method for Calculating Distance from Vehicle 1 to Tunnel Exit Using Distance Calculation Unit 303)

The distance calculation unit 303 calculates the distance from the vehicle 1 to the tunnel exit substituting, into the above equation (1), the parallax value in the vicinity of the invalid parallax region. For example, the distance calculation unit 303 calculates the distance to the tunnel exit by substituting, into the above equation (1), a parallax value calculated at a position adjacent to either the left or the right of the invalid parallax region corresponding to the tunnel exit. Alternatively, the distance to the tunnel exit may be calculated by substituting, into the above equation (1), the average value of two parallax values calculated at positions adjacent to the right and left of the invalid parallax region.

(Description of Method for Detecting Preceding Vehicle Using Preceding Vehicle Detection Unit 304)

The preceding vehicle detection unit 304 investigates whether the same (or sufficiently close) parallax value exists continuously along a vertical direction for a predetermined length or more in the vicinity of the center in the left-right direction of the parallax image. In a case where there is nothing other than the road surface in that location, the parallax values should gradually change according to the distance to the road surface. On the other hand, in a case where the same (or sufficiently close) parallax value exists continuously along the vertical direction for a predetermined length or more in the vicinity of the center in the left-right direction of the parallax image, there is a high possibility that some object exists there. In a case where the same (or sufficiently close) parallax value exists continuously along the vertical direction for a predetermined length or more in the vicinity of the center in the left-right direction of the parallax image, the preceding vehicle detection unit 304 considers that a preceding vehicle exists there.

(Description of Arithmetic Processing Using Processing Device 31)

FIG. 5 is a flowchart of arithmetic processing by the processing device 31. In step S100, the left image captured by the left camera 2L and the right image simultaneously captured by the right camera 2R are inputted to the processing device 31 via the input interface 34. In step S110, the parallax calculation unit 301 generates a parallax image by using the left image and the right image inputted in step S100.

In step S120, the preceding vehicle detection unit 304 determines whether or not a preceding vehicle is present in front of the vehicle 1. The preceding vehicle detection unit 304 investigates whether the same (or sufficiently close) parallax value exists continuously along a vertical direction for a predetermined length or more in the vicinity of the center in the left-right direction of the parallax image. In a case where an equal (or sufficiently close) parallax value exists continuously for a predetermined length or more in the vertical direction, in the vicinity of the center in the left-right direction of the parallax image, the preceding vehicle detection unit 304 considers that a preceding vehicle exists therein, and the processing advances to step S130. On the other hand, in a case where an equal (or sufficiently close) parallax value does not exist continuously for a predetermined length or more in the vertical direction, in the vicinity of the center in the left-right direction of the parallax image, the preceding vehicle detection unit 304 does not detect a preceding vehicle, and the processing advances to step S150.

In step S130, the inter-vehicle distance calculation unit 305 calculates the distance between the preceding vehicle (another vehicle) detected in step S120 and the vehicle (host vehicle) 1, that is, the inter-vehicle distance from the preceding vehicle. The inter-vehicle distance calculation unit 305 calculates the distance to the preceding vehicle by substituting, into the above equation (1), the parallax value at the position where the preceding vehicle is detected. In step S140, the relative vehicle speed calculation unit 306 calculates a relative vehicle speed between the preceding vehicle detected in step S120 and the vehicle 1. The relative vehicle speed calculation unit 306 calculates the relative vehicle speed between the preceding vehicle and the vehicle 1 by dividing the difference between the inter-vehicle distance calculated in the previous step S130 and the inter-vehicle distance calculated in the current step S130 by the difference between the time when the previous step S130 was executed and the time when the current step S130 is executed. Thereafter, the processing advances to step S150.

In step S150, the exit determination unit 302 specifies an invalid parallax region located near the vanishing point (the optical axis center of the camera) from the parallax image calculated in step S110. In step S160, the exit determination unit 302 determines whether the surface area of the specified invalid parallax region is equal to or larger than a predetermined threshold value. In a case where the surface area of the specified invalid parallax region is less than the predetermined threshold value, the exit determination unit 302 determines that the specified invalid parallax region is not the tunnel exit, and the processing illustrated in FIG. 6 ends. In a case where the surface area of the specified invalid parallax region is equal to or larger than the predetermined threshold value, the processing advances to step S170.

In step S170, the exit determination unit 302 determines whether the parallax values gradually increase in the left-right direction from the barycenter of the invalid parallax region. In a case where the parallax values do not gradually increase in the left-right direction from the barycenter of the invalid parallax region, the exit determination unit 302 determines that the specified invalid parallax region is not the tunnel exit, and the processing illustrated in FIG. 6 ends. In a case where the parallax values gradually increase in a left-right direction from the barycenter of the invalid parallax region, the processing advances to step S180.

In step S180, the exit determination unit 302 calculates, among all the pixels included in the invalid parallax region, the proportion of pixels having luminance values equal to or greater than a predetermined threshold value, and determines whether or not the proportion is equal to or greater than the predetermined threshold value. In a case where the calculated ratio is less than the predetermined threshold value, the exit determination unit 302 determines that the specified invalid parallax region is not the tunnel exit, and the processing illustrated in FIG. 6 ends. In a case where the calculated ratio is the predetermined threshold value or more, the exit determination unit 302 determines that the invalid parallax region is the tunnel exit, and the processing advances to step S190.

In step S190, the distance calculation unit 303 calculates the distance from the vehicle 1 to the tunnel exit. The distance to the tunnel exit is calculated by substituting, into the above equation (1), the parallax value in the vicinity of the invalid parallax region. For example, the distance calculation unit 303 calculates the distance to the tunnel exit by substituting, into the above equation (1), the parallax value calculated at the position adjacent to either the right or the left of the invalid parallax region.

In step S200, the exposure control unit 307 determines whether or not a preceding vehicle has been detected in step S120. In a case where the preceding vehicle has not been detected, the processing advances to step S230. On the other hand, in a case where a preceding vehicle has been detected, the processing advances to step S210. In step S210, the exposure control unit 307 calculates the distance from the preceding vehicle to the tunnel exit. The exposure control unit 307 calculates the distance from the preceding vehicle to the tunnel exit by subtracting the inter-vehicle distance (distance from the vehicle 1 to the preceding vehicle) calculated in step S130 from the distance from the vehicle 1 to the tunnel exit calculated in step S190.

In step S220, the exposure control unit 307 adjusts the exposure amount of the camera 2 according to the distance from the preceding vehicle calculated in step S210 to the tunnel exit so that the exposure of the camera 2 matches the light environment outside the tunnel at the timing when the preceding vehicle reaches the tunnel exit (passes through the tunnel exit). For example, the exposure control unit 307 adjusts the exposure amount so as to achieve appropriate exposure with respect to the luminance values of the pixels that exist in the invalid parallax region. Alternatively, the exposure control unit 307 may record the exposure amount before the vehicle 1 enters the tunnel, and adjust the exposure amount of the camera 2 so that the exposure amount becomes the exposure amount just recorded at the timing when the preceding vehicle passes through the tunnel exit. Thereafter, the processing illustrated in FIG. 6 ends.

In the nonvolatile memory 32, a distance-exposure amount table corresponding to the distance from the preceding vehicle to the tunnel exit is stored in advance. In step S220, the exposure control unit 307 converts the distance-exposure amount table into the time-exposure amount table by using the speed of the preceding vehicle calculated from the relative speed of the preceding vehicle and the speed of the vehicle 1, and determines the schedule of the exposure amount control. Note that, instead of using such a table, the schedule for exposure amount control may be determined by a mathematical expression which utilizes the distance from the preceding vehicle to the tunnel exit, the speed of the preceding vehicle, and the elapsed time.

In step S230, the exposure control unit 307 adjusts the exposure amount of the camera 2 according to the distance from the vehicle 1 to the tunnel exit calculated in step S190 so that the exposure of the camera 2 matches the light environment outside the tunnel at the timing immediately before the vehicle 1 reaches the tunnel exit (passes through the tunnel exit). For example, the exposure control unit 307 adjusts the exposure amount so as to achieve appropriate exposure with respect to the luminance values of the pixels that exist in the invalid parallax region. Alternatively, the exposure control unit 307 may record the exposure amount before the vehicle 1 enters the tunnel, and adjust the exposure amount of the camera 2 so that the exposure amount becomes the exposure amount just recorded at the timing immediately before the vehicle 1 reaches the tunnel exit (passes through the tunnel exit). Thereafter, the processing illustrated in FIG. 6 ends.

In the nonvolatile memory 32, a distance-exposure amount table corresponding to the distance from the vehicle 1 to the tunnel exit is stored in advance. In step S230, the exposure control unit 307 uses the speed of the vehicle 1 to convert the distance-exposure amount table into the time-exposure amount table, and determines the schedule of the exposure amount control. Note that, instead of using such a table, the schedule for exposure amount control may be determined by a mathematical expression which utilizes the distance from the vehicle 1 to the tunnel exit, the speed of the vehicle 1, and the elapsed time.

Note that, as a method for adjusting the exposure amount by using the exposure control unit 307, a known technique may be used. For example, the shutter speed of the camera 2, that is, the exposure time, may be adjusted, the aperture diameter of the diaphragm of the camera 2 may be adjusted, or the sensitivity (amplification factor) of the imaging element of the camera 2 may be adjusted.

The first embodiment described above affords the following operational effects:

(1) The processing device (computation device) 31 calculates, for each of a plurality of regions included in the image which have been captured by the camera 2, the parallax of a subject image included in the regions, and determines whether or not a tunnel exit exists in a specific region among the plurality of regions on the basis of the position of a region, among the plurality of regions, for which the parallax of the subject image cannot be calculated and a parallax calculated in another region located near the region for which the parallax of the subject image cannot be calculated. Due to this configuration, it is possible to detect an exit and entrance of a tunnel without waiting for detection of a preceding vehicle. In addition, the exit and entrance of the tunnel can be detected irrespective of the existence of a preceding vehicle.

(2) When there is a region for which the parallax of the subject image cannot be calculated in the vicinity of the optical axis of the camera 2 (imaging device), in a case where the parallaxes calculated for a plurality of other regions arranged in a row toward the left which exist on the left side of the region or for a plurality of other regions arranged in a row toward the right which exist on the right side of the region gradually increase in moving away from the region, the processing device 31 determines that the tunnel exit exists in the region. Thus, not only the presence or absence of the invalid parallax region but also the characteristic parallax pattern is used for the tunnel exit, and therefore the tunnel exit can be accurately detected.

(3) The processing device 31 controls exposure of the camera 2 (imaging device) while the vehicle 1 travels to the tunnel exit, on the basis of the distance from the vehicle 1 to the tunnel exit and the speed of the vehicle 1. Therefore, it is possible to always maintain appropriate exposure until the vehicle 1 reaches the tunnel exit after the tunnel exit is detected.

(4) The processing device 31 detects a preceding vehicle traveling in front of the vehicle 1 from the image, and controls exposure of the camera 2 (imaging device) while the preceding vehicle travels to the tunnel exit, on the basis of the positional relationship between the preceding vehicle and the tunnel exit. Therefore, the proper exposure can always be maintained until the preceding vehicle reaches the tunnel exit after the tunnel exit is detected, and thus the preceding vehicle can be continuously detected without being lost.

Second Embodiment

An image processing device according to a second embodiment of the present invention will be described with reference to FIGS. 6 to 8. Note that components which are the same as or which correspond to the components described in the first embodiment will be denoted by the same reference signs, and the differences will be mainly described.

FIG. 6 is a functional block diagram of the image processing device 300 according to the second embodiment. The image processing device 300 includes an exit determination unit 1302 instead of the exit determination unit 302. The exit determination unit 1302 determines the presence or absence of a tunnel exit on the travel path of the vehicle 1 by using the parallax image calculated by the parallax calculation unit 301.

FIG. 7 is a diagram schematically showing a left image 40L, a right image 40R, and a parallax image 50. The left image 40L and right image 40R illustrated in FIG. 7 are images captured in a tunnel. The left image 40L and the right image 40R include the tunnel exit 6 and the preceding vehicle 7. Here, it is assumed that the exposure of the camera 2 is suppressed to such an extent that blown-out highlights do not occur at the tunnel exit 6. In this case, the parallax calculation unit 301 is capable of correctly calculating the parallax at the tunnel exit 6. Meanwhile, because the exposure of the camera 2 is moderate, it is assumed that blackened-out spots occur in dark portions in the tunnel, for example, portions which are hardly reached by external light from the tunnel exit or illumination light in the tunnel. In this case, the parallax calculation unit 301 cannot calculate the parallax of such dark portions. In other words, in the parallax image 50 generated by the parallax calculation unit 301, such dark portions become an invalid parallax region.

In the parallax image 50 illustrated in FIG. 7, the five regions F, G, H, I, and J exist in ascending order of parallax. That is, the region F is the region having the smallest parallax, and the region J is the region having the largest parallax. In addition to these regions F to J, there is a region X for which the parallax cannot be calculated. As can be seen from parallax image 50 illustrated in FIG. 7, a relatively large parallax value is obtained in region J close to vehicle 1, and a relatively small parallax value is obtained in region F (corresponding to tunnel exit 6) far from vehicle 1. Meanwhile, a region X corresponding to a portion far from the tunnel exit 6 and which is difficult for external light to reach from outside the tunnel is an invalid parallax region.

The exit determination unit 1302 first investigates whether there is an invalid parallax region in the left and right end portions of the parallax image 50. For example, focusing on the pixel blocks having a width of 10 from the left and right edges of the parallax image 50, it is investigated whether an invalid parallax region exists in these pixel blocks. In a case where the invalid parallax regions exist, the exit determination unit 1302 goes around the valid parallax regions arranged in a row from the invalid parallax regions toward the vicinity of the optical axis, and investigates whether the parallax values corresponding to the regions gradually decrease. For example, in the parallax image 50 illustrated in FIG. 7, the regions J, I, H, G, and F exist in this order from region X which exists at the left and right edges toward the center of the image. That is, the parallax values gradually decrease from region X toward the center of the image. In a case where the parallax values gradually decrease, the exit determination unit 1302 determines that the region having the smallest parallax value which exists in the vicinity of the center of the image is the tunnel exit, that is, the tunnel exit exists at the position of the region having the smallest parallax value.

FIG. 8 is similar to FIG. 5 and is a flowchart showing an example of arithmetic processing executed by the processing device according to the second embodiment. In the flowchart of FIG. 8, instead of the processing of steps S150 to S180 of the flowchart in FIG. 5, the processing of steps S250 to S260 is executed.

In step S250, the exit determination unit 1302 focuses on the pixel blocks having a width of 10 from the left and right edges of the parallax image calculated in step S110, and determines whether or not an invalid parallax region exists in these pixel blocks. In a case where there is no invalid parallax region on at least one of the left and right edges, the exit determination unit 1302 determines that the tunnel exit cannot be detected, and the processing illustrated in FIG. 8 ends. In a case where there is an invalid parallax region on both the left and right edges, the processing advances to step S260.

In step S260, the exit determination unit 1302 goes around the valid parallax region from these invalid parallax regions toward the vicinity of the optical axis, and determines whether or not the parallax values corresponding to these regions gradually decrease. In a case where the parallax values do not gradually decrease on at least one of the left and right edges (for example, in a case where another invalid parallax region exists before reaching the vicinity of the optical axis), the exit determination unit 1302 determines that the tunnel exit cannot be detected, and the processing illustrated in FIG. 8 ends. In a case where the parallax values gradually decrease on both the right and left edges, the processing advances to step S190.

The second embodiment described above affords the following operational effects:

(1) When there is a region for which the parallax of the subject image can be calculated in the vicinity of the optical axis of the camera 2 (imaging device), the processing device 31 determines, in a case where there is a region for which the parallax of the subject image cannot be calculated on the left and right of the region, that a tunnel exit exists in that region. Due to this configuration, it is possible to detect a tunnel exit that is resistant to blackened-out spots but not blown-out highlights.

The following modifications are also within the scope of the present invention, and it is also possible to combine configurations illustrated in the modifications with the configurations described in the above-described embodiment, combine the configurations described in the above-described different embodiments, or combine the configurations described in the following different modifications.

Modification 1

Instead of the surface area of the invalid parallax region in the vicinity of the optical axis, the shape (outer shape) of the invalid parallax region may be investigated. For example, the exit determination unit 302 may investigate whether the shape of the invalid parallax region is a semicircular shape assumed as the tunnel exit, and may determine that the tunnel exit exists only in a case where the shape is a semicircular shape or a shape close to a semicircular shape. The tunnel exit detection accuracy can thus be improved.

Modification 2

In the left image, instead of determining that the parallax cannot be calculated in a case where the luminance values of all the pixels in the pixel block are the maximum value, it may be determined that the parallax cannot be calculated in the corresponding region of the parallax image if the number of pixels having luminance values at the maximum value in the pixel block is equal to a certain number (or a certain ratio) or more.

Modification 3

The first embodiment and the second embodiment may be combined to cope with both blown-out highlights and blackened-out spots. A more accurate tunnel exit detection function can thus be provided.

Although embodiments of the present invention have been described above, the above-described embodiments merely illustrate some of the application examples of the present invention, and the technical scope of the present invention is not intended to be limited to the specific configurations of the above embodiments.

REFERENCE SIGNS LIST

1 vehicle
2 camera
2L left camera
2R right camera
3 image processing device
31 processing device (computation device)
32 nonvolatile memory
33 volatile memory
34 input interface
35 output interface
301 parallax calculation unit
302, 1302 exit determination unit
303 distance calculation unit
304 preceding vehicle detection unit
305 inter-vehicle distance calculation unit
306 relative vehicle speed calculation unit
307 exposure control unit

The invention claimed is:

1. An image processing device, comprising:

a computation device to which an image obtained by using an imaging device to capture an area in front of a vehicle is inputted, the computation device comprising at least one processor coupled with memory, to:

calculate, for each of a plurality of regions included in the image, a parallax of a subject image included in the plurality of regions;

identify, from the plurality of regions, a first region for which the parallax of the subject image cannot be calculated;

obtain a plurality of parallax values calculated for a subset of regions of the plurality of regions different from the first region, wherein the subset of regions is arranged from closest to furthest from the first region;

determine a successive increase in the plurality of parallax values of the subset of regions arranged from closest to furthest from the first region; and determine that a tunnel exit exists at the first region based on the successive increase in the plurality of parallax values.

2. The image processing device according to claim 1, wherein, when there is the first region for which the parallax of the subject image cannot be calculated in a vicinity of an optical axis of the imaging device, in a case where parallax values calculated for a plurality of other regions arranged in a row toward a left which exist on a left side of the first region or for a plurality of other regions arranged in a row toward a right which exist on a right side of the first region successively increase in moving away from the first region, the at least one processor is to determine that the tunnel exit exists in the plurality of regions.

3. The image processing device according to claim 1, wherein, when there is a region for which the parallax of the subject image has been calculated in a vicinity of an optical axis of the imaging device, in a case where there is a region for which the parallax of the subject image has not been calculated on the left and right of the region, the computation device determines that a tunnel exit exists in the region.

4. The image processing device according to claim 1, wherein the computation device controls exposure of the imaging device while the vehicle travels to the tunnel exit, based on a distance from the vehicle to the tunnel exit and speed of the vehicle.

5. The image processing device according to claim 1, wherein the computation device:

detects, from the image, a preceding vehicle traveling in front of the vehicle, and controls exposure of the imaging device while the preceding vehicle travels to the tunnel exit, based on a positional relationship between the preceding vehicle and the tunnel exit.

* * * * *